US012781782B2

(12) United States Patent
Alla Anantha et al.

(10) Patent No.: US 12,781,782 B2
(45) Date of Patent: Nov. 3, 2026

(54) HOLDER ARRANGEMENT COMPRISING A BRACKET AND A SPACER, AND A MANUFACTURING METHOD FOR MANUFACTURING A SPACER

(71) Applicant: Volvo Truck Corporation, Gothenburg (SE)

(72) Inventors: Lakshmi Narayana Rama Krishna Alla Anantha, Karnataka (IN); Benoy Thomas, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 1126 days.

(21) Appl. No.: 17/777,429

(22) PCT Filed: Nov. 12, 2020

(86) PCT No.: PCT/EP2020/081915
§ 371 (c)(1),
(2) Date: May 17, 2022

(87) PCT Pub. No.: WO2021/099206
PCT Pub. Date: May 27, 2021

(65) Prior Publication Data

US 2022/0397142 A1 Dec. 15, 2022

(30) Foreign Application Priority Data

Nov. 22, 2019 (IN) ............................. 201941047905

(51) Int. Cl.
*F16B 5/12* (2006.01)
*F16B 9/00* (2006.01)

(52) U.S. Cl.
CPC .............. *F16B 5/123* (2013.01); *F16B 9/056* (2018.08)

(58) Field of Classification Search
CPC ...... F16B 2/22; F16B 9/02; F16B 9/05; F16B 9/054; F16B 9/056; F16B 9/09;
(Continued)

(56) References Cited

U.S. PATENT DOCUMENTS

| | | | | |
|---|---|---|---|---|
| 4,405,108 A * | 9/1983 | Muirhead | ............ | A47F 5/0823 211/DIG. 1 |
| 4,786,025 A * | 11/1988 | Shuman | .................... | G09F 7/20 248/222.12 |

(Continued)

FOREIGN PATENT DOCUMENTS

| | | |
|---|---|---|
| CN | 103944120 A | 7/2014 |
| CN | 203774503 U | 8/2014 |

(Continued)

OTHER PUBLICATIONS

Intention to Grant for European Patent Application No. 20808032.5, mailed Aug. 10, 2023, 54 pages.

(Continued)

*Primary Examiner* — Michael P Ferguson
*Assistant Examiner* — Zachary A Hall
(74) *Attorney, Agent, or Firm* — Withrow & Terranova, PLLC

(57) ABSTRACT

The invention relates to a holder arrangement for holding routing media, such as a cable or the like to a support structure. The holder arrangement comprises a spacer being configured for attachment to the support structure, and a bracket comprising a routing media supporting portion and a spacer receiving portion for holding the spacer. The spacer receiving portion comprises an inner wall which is provided with a bracket axial locking arrangement configured for mating with corresponding spacer axial locking arrangement to axially lock the bracket in relation to the spacer.

15 Claims, 14 Drawing Sheets

(58) Field of Classification Search

CPC ........ F16B 21/06; F16B 21/07; F16B 21/073; F16B 21/078; Y10T 403/4637; Y10T 403/7047; Y10T 403/7051; Y10T 403/7052; Y10T 403/7073; F16M 13/02; F16M 11/2064

USPC ............ 403/243, 365, 367, 368; 248/220.22, 248/222.11, 222.12, 225.21, 56

See application file for complete search history.

(56) References Cited

U.S. PATENT DOCUMENTS

| | | | | | |
|---|---|---|---|---|---|
| 5,350,266 | A * | 9/1994 | Espey | B62J 23/00 | 403/375 |
| 5,388,359 | A * | 2/1995 | DeWitt | G09F 7/18 | 248/231.71 |
| 6,786,671 | B1 * | 9/2004 | Eckendorff | F16D 1/0888 | 403/374.1 |
| 7,413,367 | B2 * | 8/2008 | Hawang | F16B 5/0614 | 403/243 |
| 10,250,024 | B2 * | 4/2019 | Eyles | H02G 3/0437 | |
| 11,624,389 | B2 * | 4/2023 | Eliot | A62C 33/00 | 138/104 |
| 2018/0236915 | A1 | 8/2018 | Agonia et al. | | |
| 2019/0048919 | A1 | 2/2019 | Hess et al. | | |
| 2019/0293103 | A1 | 9/2019 | Isaji | | |

FOREIGN PATENT DOCUMENTS

| | | | |
|---|---|---|---|
| CN | 203826601 | U | 9/2014 |
| CN | 108361249 | A | 8/2018 |
| EP | 1772935 | A2 | 4/2007 |
| FR | 2970050 | A1 | 7/2012 |
| WO | 2019141843 | A1 | 7/2019 |

OTHER PUBLICATIONS

First Office Action for Chinese Patent Application No. 202080080274.X, mailed Dec. 1, 2023, 13 pages.

International Search Report and Written Opinion for International Patent Application No. PCT/EP2020/081915, mailed Feb. 24, 2021, 15 pages.

International Preliminary Report on Patentability for International Patent Application No. PCT/EP2020/081915, mailed Jul. 13, 2021, 15 pages.

* cited by examiner

HOLDER ARRANGEMENT COMPRISING A BRACKET AND A SPACER, AND A MANUFACTURING METHOD FOR MANUFACTURING A SPACER

This application is a 35 USC 371 national phase filing of International Application No. PCT/EP2020/081915, filed Nov. 12, 2020, which claims the benefit of Indian Patent Application number 201941047905, filed Nov. 22, 2019, the disclosures of which are incorporated herein by reference in their entireties.

TECHNICAL FIELD

The invention relates to the field of holder arrangements for routing media, for example holding arrangements used for holding and securing cables and the like in a vehicle, such as e.g. trucks, buses and construction equipment, e.g. wheel loaders, articulated haulers, excavators and backhoe loaders. The holder arrangement may also be used for general holding purposes in another technical filed. The invention also relates to the manufacturing of a spacer comprised in such holding arrangement.

BACKGROUND

Holder arrangements for holding routing media, such as cables and the like, are used in various industries and are employed in e.g. vehicles, in machinery, for duct work, and other applications. A holder arrangement is typically configured to provide attachment for a cable or any elongated member such as e.g. a wire, a tube, a pipe, a hose, a conduit, or any other similar cablelike structure, to some support structure. Typically, the holder arrangement is configured for attaching a plurality of cables or the like, such as e.g. a bundle of cables or other elongated members. One main advantage of using a holder arrangement for attaching cables or the like to a support structure, is that the cables may be desirably arranged and may be positioned not to be in the way of, or to interfere with, operation of the application for which the cables are used. For example, cables which are not securely held to the support structure may become loose and may interfere with the operation of the application, or may be caught by a moving part and be cut off causing risk of damages to both personnel and the application for which the cables are used.

Many applications using cables or the like are associated with space constraints which makes it desirable to arrange and position the cables in a certain way. The final desired arrangement and position of the cables may furthermore be apparent first during the cable routing, which may be carried out upon final assembly of the application.

EP 1 772 935 discloses a holder arrangement for cables and the like having a plug connector which is received in a base part, which holder arrangement can be rotationally positioned in a desired way, and which can be locked in such position. However, the holder arrangement in EP 1 772 935 has some drawbacks. For example, assembly of the holder arrangement to a support structure is relatively complex as the base part is to be received in a hole of the support structure, and the rotational position of the plug connector may unintentionally be change, as the application of an external load to the cable or plug connector may result in a force within the holder arrangement causing the plug connector to be unlocked relative the base part. Furthermore, the holder arrangement in EP 1 772 935 is relatively complex and difficult to manufacture.

Accordingly, it is desirable to provide a holder arrangement that is easy to handle and easy to manufacture, and that can be attached to a support structure for holding and securing routing media in a desired manner.

SUMMARY

In view of the above-mentioned and other drawbacks of the prior art, the object of the present inventive concept is to provide a holder arrangement which at least partly alleviates the drawbacks of the prior art.

The present invention is based on the insight that a holder arrangement which is configured to hold routing media in a certain position relative a support structure, can be arranged and configured to transfer induced forces by an applied external load to the holder arrangement, from the holder arrangement to the support structure, in such a way that unintentional relative movement between holder arrangement and the support structure, or within separate parts of the holder arrangement, is avoided or at least where the risk of such unintentional movement is minimized. More specifically, the present invention is based on the insight that the holder arrangement can comprise at least two separate parts, a bracket for supporting the routing media, and a spacer which is configured to rotationally position the bracket in relation to the support structure. By providing the bracket with at least one separate load transferring surface being functionally and structurally separate from any rotational or axial locking arrangement, the risk of unintentional movement between the spacer and the bracket is minimized, or at is least reduced compared to prior art solutions.

According to a first aspect of the present disclosure, a holder arrangement for holding routing media to a support is provided. The holder arrangement comprises a spacer configured for attachment to the support structure and a bracket. The bracket comprises a routing media supporting portion configured to support the routing media, a spacer receiving portion for receiving the spacer, and a bracket axial locking arrangement arranged to engage a corresponding spacer axial locking arrangement comprised in the spacer to axially fix a received spacer. At least one of the spacer axial locking arrangement and the bracket axial locking arrangement comprises a circumferential groove and the other of the spacer axial locking arrangement and the bracket axial locking arrangement comprises at least one corresponding protrusion. The groove has a first and a second side wall extending radially from a groove base, and laterally to an axial direction, the second side wall being closer to the support structure compared to the first side wall when the spacer is received in the spacer receiving portion. The holder arrangement is characterized in that at least the first side wall forms a first angle with respect to the groove base such that a width of the base of the groove is wider than the width of the top of the groove in the axial direction. The holder arrangement is further characterized by the at least one protrusion comprising a contact surface arranged to match the first side wall, thereby forming a catch mechanism.

A push force is needed for a protrusion support structure of the bracket axial locking arrangement to bend in a radial direction, in order for the protrusion to engage a snap-lock to the groove. Once the snap-lock mechanism is engaged, the bracket is axially locked to the spacer. The snap-lock mechanism can withstand a force in the axial direction facing away from the spacer, i.e. pull force which is in the opposite direction of the push force. At some point, as the pull force increases, the snap-lock mechanism will fail, and the bracket will come loose from the spacer. This is at least partly due to the protrusion support structure bending in the radial direction. The angled first side wall together with the matching protrusion forms a snap-lock mechanism where the pull force the holding arrangement can withstand is larger than the required push force, since the first angle requires the protrusion to shear when a pull force is exerted onto the bracket. This provides a robust holder arrangement that is easy to manufacture and easy to assemble.

According to aspects, the spacer axial locking arrangement comprises the groove and the bracket axial locking arrangement comprises the at least one protrusion.

According to aspects, the spacer axial locking arrangement comprises the at least one protrusion and the bracket axial locking arrangement comprises the groove.

According to aspects, the bracket comprises a resilient member configured to repel the bracket axially in a direction away from the support structure to engage a snap-lock of the bracket and the spacer. According to some such aspects, the bracket comprises at least one resilient member configured to repel the bracket axially in a direction away from the support structure such that the spacer axial locking arrangement engages the bracket axial locking arrangement in a locking position This eliminates any eventual play in the axial direction of the protrusion (and correspondingly the bracket), after the snap-lock is engaged, wherein the eventual play is due to the first angle of the first wall. The resilient member is configured to lock the protrusion into place in the groove, wherein the protrusion is arranged snugly against the first side wall. The resilient member provides a spring feature that results in a force exerted on the bracket in the axial direction away from the support structure, which the spacer is attached on. Thereby, the bracket becomes locked into a final position.

According to aspects, the first angle of the first side wall is in the span of 20 to 45 degrees.

Hereby, the protrusion is robust, and it provides resilience to a large pull force for the holding arrangement. If the first angle is large than 45 degrees, the force required for the protrusion support structure to bend may come larger than the force required for the protrusion to shear. If the first angle is less than 20 degrees, the protrusion and the first side wall may become brittle.

According to aspects, the second side wall forms a second angle with respect to groove base, wherein the second angle has the same value as the first angle.

A circumferential groove with symmetrical side walls is easier to manufacture compared to non-symmetrical side walls. In addition, if the groove has symmetrical side walls and is arranged centered in the axial direction on the spacer, the spacer may be mounted in any of the two axial orientations onto the support structure which is advantageous.

According to aspects, the spacer comprises a rotational locking arrangement with axial spacer ridges arranged along the axial direction of the spacer, and the bracket comprises rotational locking arrangement with at least one axial bracket ridge adapted to mate with the axial spacer ridges.

Hereby, a relatively easy by yet effective means for providing rotational locking between the bracket and the spacer is provided. The rotationally symmetric nature provides an easy assembly of the holder arrangement. By having the axial spacer ridges provided along the entire circumference of an outer wall, the rotational locking of the bracket and the spacer is activated as soon as the spacer is received in a spacer receiving volume of the bracket, regardless of direction of application.

According to aspects, an inner wall of the spacer receiving portion is circumferentially divided between a first wall portion type comprising the bracket rotational locking arrangement, and a second wall portion type comprising a bracket load transferring surface. The bracket load transferring surface is configured to engage the spacer to snugly fit the bracket to the spacer when the spacer is received in the spacer receiving portion. The first and second wall portion types are alternately and repeatedly arranged along the entire circumference of the inner wall.

Hereby, the load transferring (e.g. the transfer of forces or moment) via the bracket load transferring surface may be improved and/or increased. In the assembled state, i.e. when the spacer is received in the spacer receiving portion, the bracket load transferring surfaces are in contact with the outer wall of the spacer, or more specifically, in contact with the top portion of some of the axial spacer ridges, for transferring loads from the bracket to the spacer. By transferring loads (e.g. forces or moments) via surfaces not providing for the axial or rotational locking, unintentional movement of the bracket relative the spacer can be avoided, or the risk thereof at least be reduced. In other words, as the bracket rotational and axial locking arrangement (i.e. the protrusion and the axial bracket ridges) are distant, and separated from the bracket load transferring surfaces, load (e.g. forces and moments) may be transferred between the bracket and the spacer, such as between the inner wall portion of the spacer receiving portion and the outer wall of the spacer, at least as a complement to load transfer via the rotational and axial locking arrangement.

According to aspects, the spacer comprises a spacer through hole configured for receiving a fastener, such as e.g. the elongated body of a bolt, for attachment to the support structure. The spacer receiving portion is a through hole enabling access to the spacer when the spacer is received in the spacer receiving portion.

Hereby, a top portion of the spacer, such as e.g. the flat first side of the spacer, may be access even after assembly of the bracket to the spacer. Thus, any fastener used to secure the spacer to the support structure may be accessed even after assembly of the bracket to the spacer. Hereby, the spacer can be loosened or more tightly fixed to the support structure by adjusting the fastener. Moreover, by enabling access to the spacer, such as the top side of the spacer, after assembly of the bracket to the spacer, an additional spacer can be stacked on top of the spacer, and possibly secured to the support structure by the same fastener (further elaborated below).

Moreover, by providing a bracket with a spacer receiving portion which is formed as a through hole enabling access to the spacer when the spacer is received in the spacer receiving volume, the bracket and the spacer can be pre-assembled prior to attaching or securing the holder arrangement to the support structure by using e.g. a fastener. In other words, access to the spacer, when the spacer is received in the spacer receiving volume, provides a possibility for the fastener to attach the spacer to the support structure even when the bracket is assembled to the spacer.

According to aspects, the spacer further comprises a first side perpendicularly arranged to the spacer through hole. The first side has a fastener contacting surface which, in use, is configured as a counter holding surface for the fastener, such as e.g. the bolt head of a bolt. The fastener contacting surface has a smaller radial extension compared to a radial extension of the spacer receiving portion, such that the bracket can be attached to the spacer, subsequently to fastening the spacer to the support structure by means of the fastener.

By having fastener contacting surface of the spacer which is smaller compared to the spacer receiving volume, a fastener having a corresponding spacer contacting surface to the fastener contacting surface, can be used to attach or secure the spacer to the support structure, prior to assembly of the bracket to the spacer. In other words, the bracket may be applied to the spacer, wherein the spacer is attached or secured to the support structure by the fastener, as the spacer receiving volume is sized and dimensioned to hold the spacer, and a fastener in contact with the fastener contacting surface.

According to aspects, the fastener contacting surface comprises a reinforcement portion.

Hereby, the holder arrangement may withstand large compressive forces from the fastener, such as a bolt axial force.

According to aspects, the reinforcement portion comprises metal.

Hereby, the creep property associated with plastic is avoided and the reinforcement portion is robust.

According to aspects, the reinforcement portion comprises a reinforced structure, such as a honeycomb structure or a lattice structure.

Hereby, the reinforce structure is robust without adding significant weight.

According to aspects, the spacer is a first spacer and the bracket is a first bracket, and the holder arrangement further comprises a second spacer configured for attachment to the support structure, the second spacer being equal, or substantially equal, to the first spacer. The holder arrangement further comprises a second bracket having a routing media supporting portion configured to support routing media, and a spacer receiving portion for holding the second spacer, the spacer receiving portion of the second bracket being equal, or substantially equal, to the spacer receiving portion of the first bracket. When in use, the first and the second spacers can be stacked on top of each other such that the spacer through holes align and thus enabling fastening of the first and the second spacers to the support structure by the same fastener.

By the provision of having a spacer receiving volume of the first bracket formed as a through-hole, the first side, such as a top side, of the first spacer can be accessed even after assembly of the first bracket to the first spacer, and thus a second spacer can be arranged adjacent to the first spacer, the second spacer being configured to hold the second bracket. Hereby, more than one bracket can be attached to the support structure using only one fastener. According to at least one example embodiment, a further spacer and a corresponding further bracket can be comprised in the holder arrangement, the further spacer being stacked on the second spacer.

Effects and features of the second spacer and the second bracket are largely analogous to those described above in connection with the first spacer and the first bracket, respectively. Embodiments mentioned in relation to the first spacer and the first bracket are largely compatible the second spacer and the second bracket, respectively.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

Figure 1:
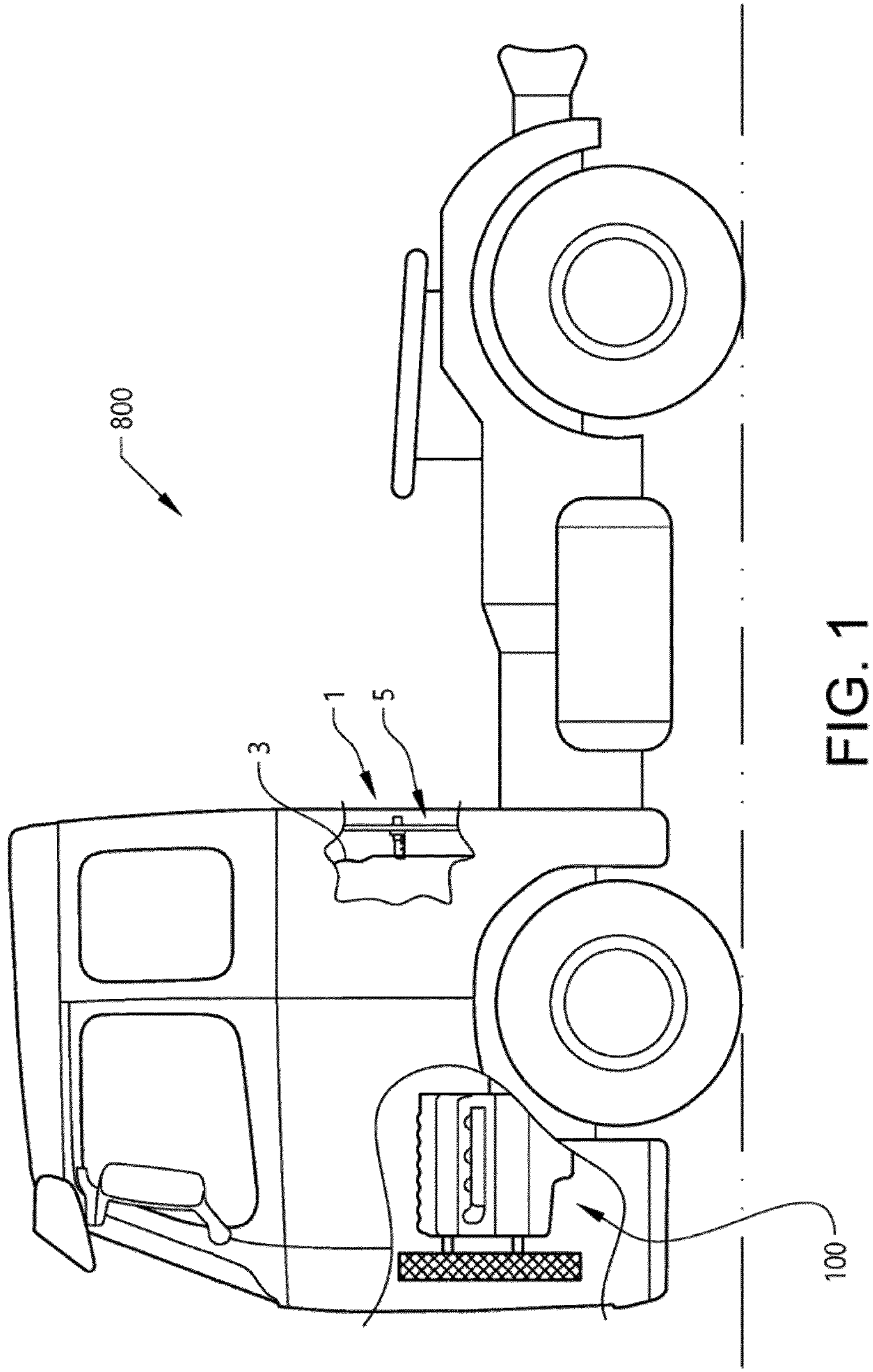
FIG. 1 is a side view of a vehicle comprising a holder arrangement attached to a support structure within the vehicle according to an example embodiment of the present invention.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

The terminology used herein is for describing aspects of the disclosure only and is not intended to limit the invention. As used herein, the singular forms “a”, “an” and “the” are intended to include the plural forms as well, unless the context clearly indicates otherwise.

With particular reference to FIG. 1, there is provided a vehicle 800 comprising a holder arrangement 1 holding a routing media 3, attached to a support structure 5 within the vehicle 800, according to one example of the present invention. The vehicle 800 depicted in FIG. 1 is a truck 800 having an engine 100 for which the inventive concept may be used with. However, the inventive concept may as well be used in another vehicle, such as e.g. in a bus or in a working machine, or in another application such as e.g. in any industry where cabling and routing are needed.

Figure 2A:
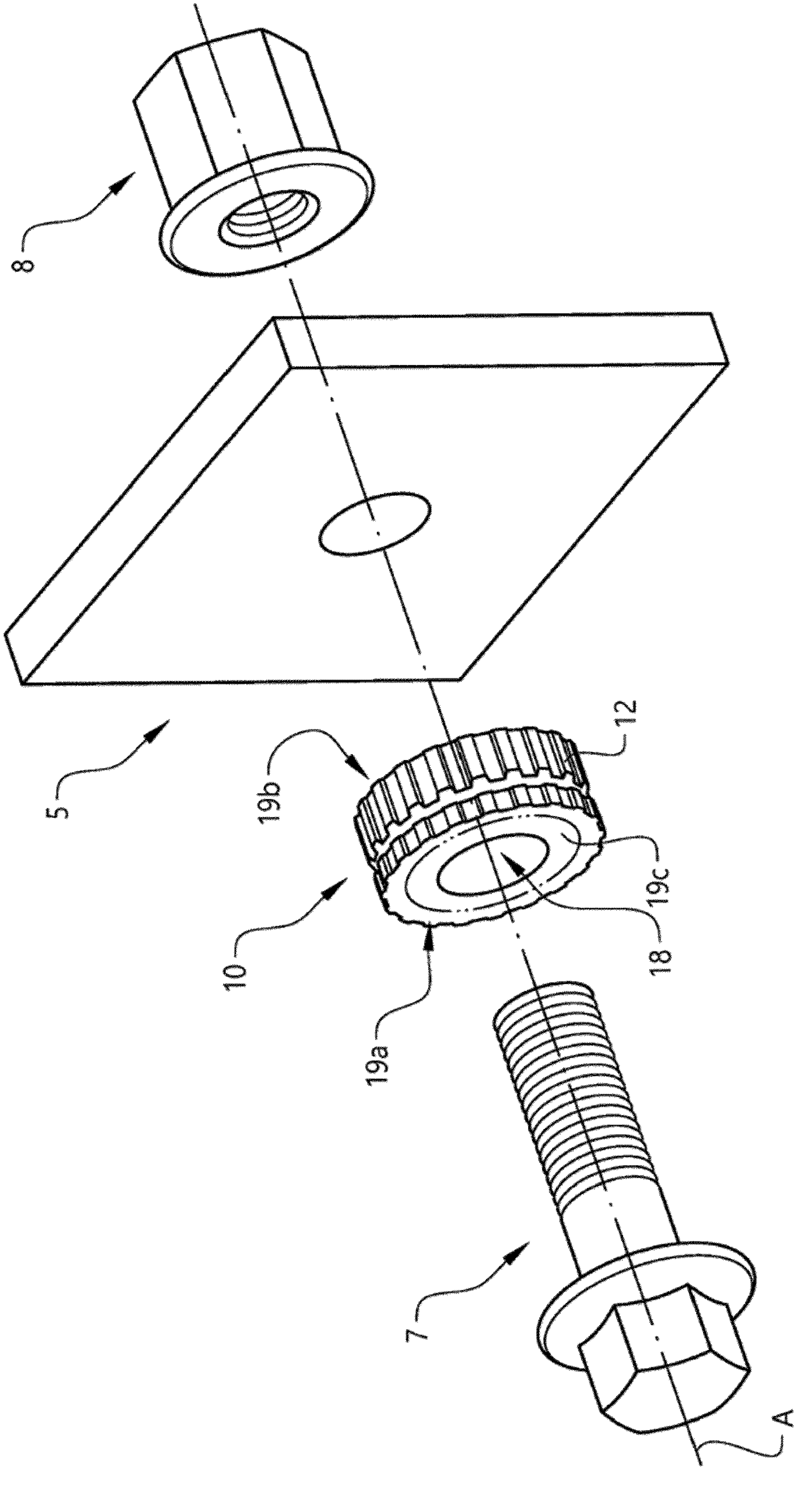
FIGS. 2A and 2B are exploded perspective views of the holder arrangement comprising a bracket and a spacer according to an example embodiment of the present invention.
Figure 2B:
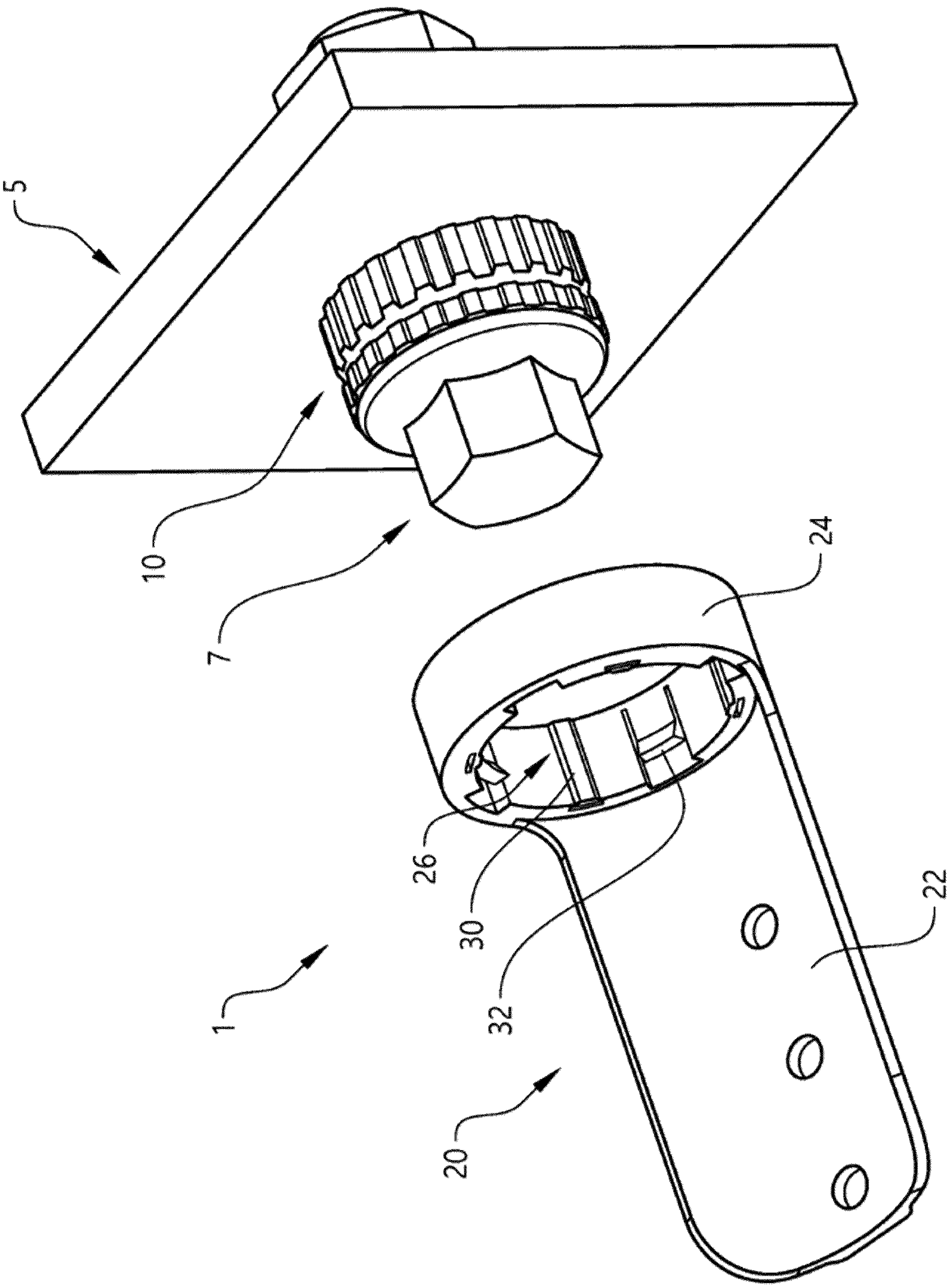
Figure 3:
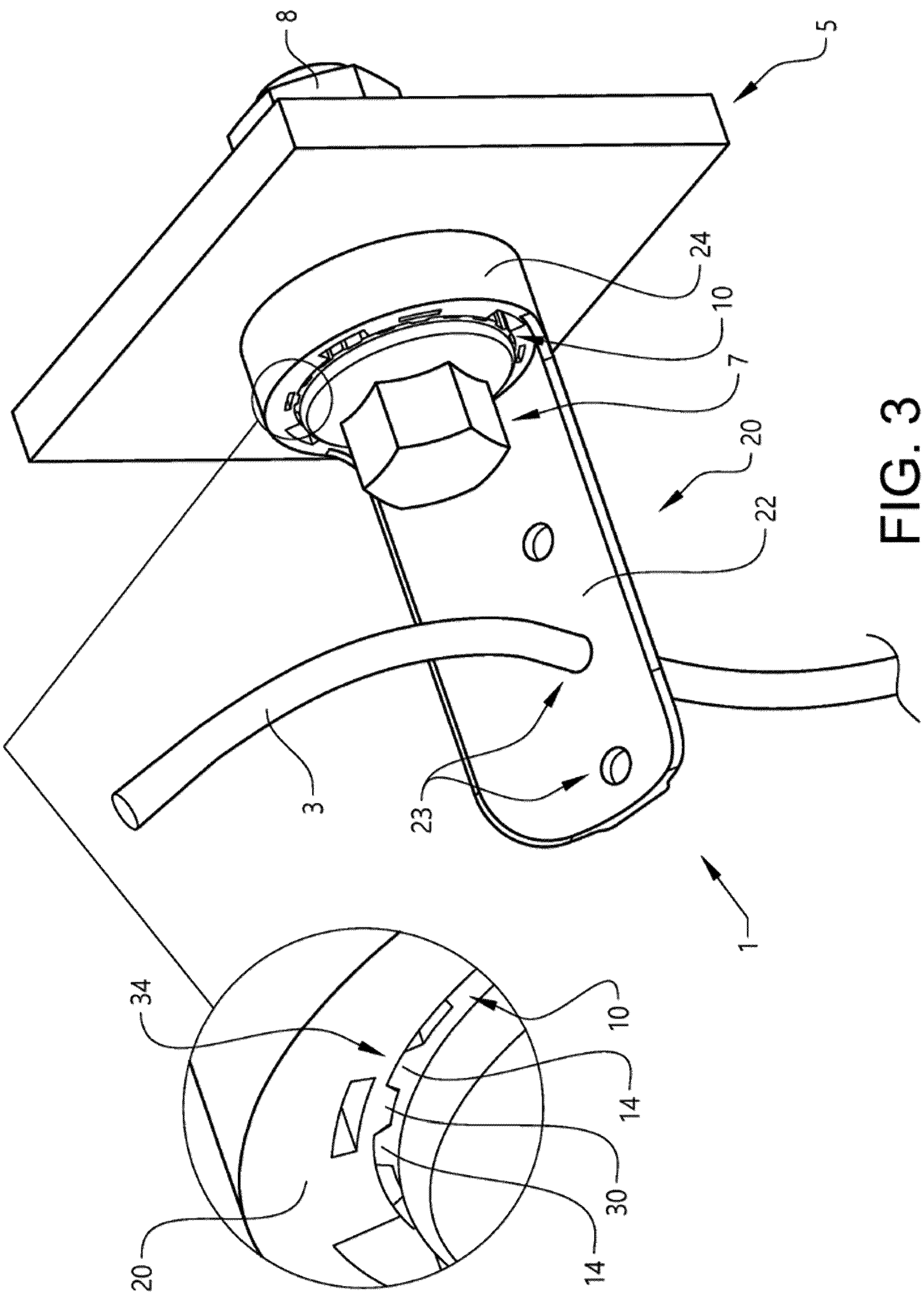
FIG. 3 is a perspective view of the holder arrangement of FIG. 2B when being attached to a support structure portion, according to an example embodiment of the present invention.
Figure 4:
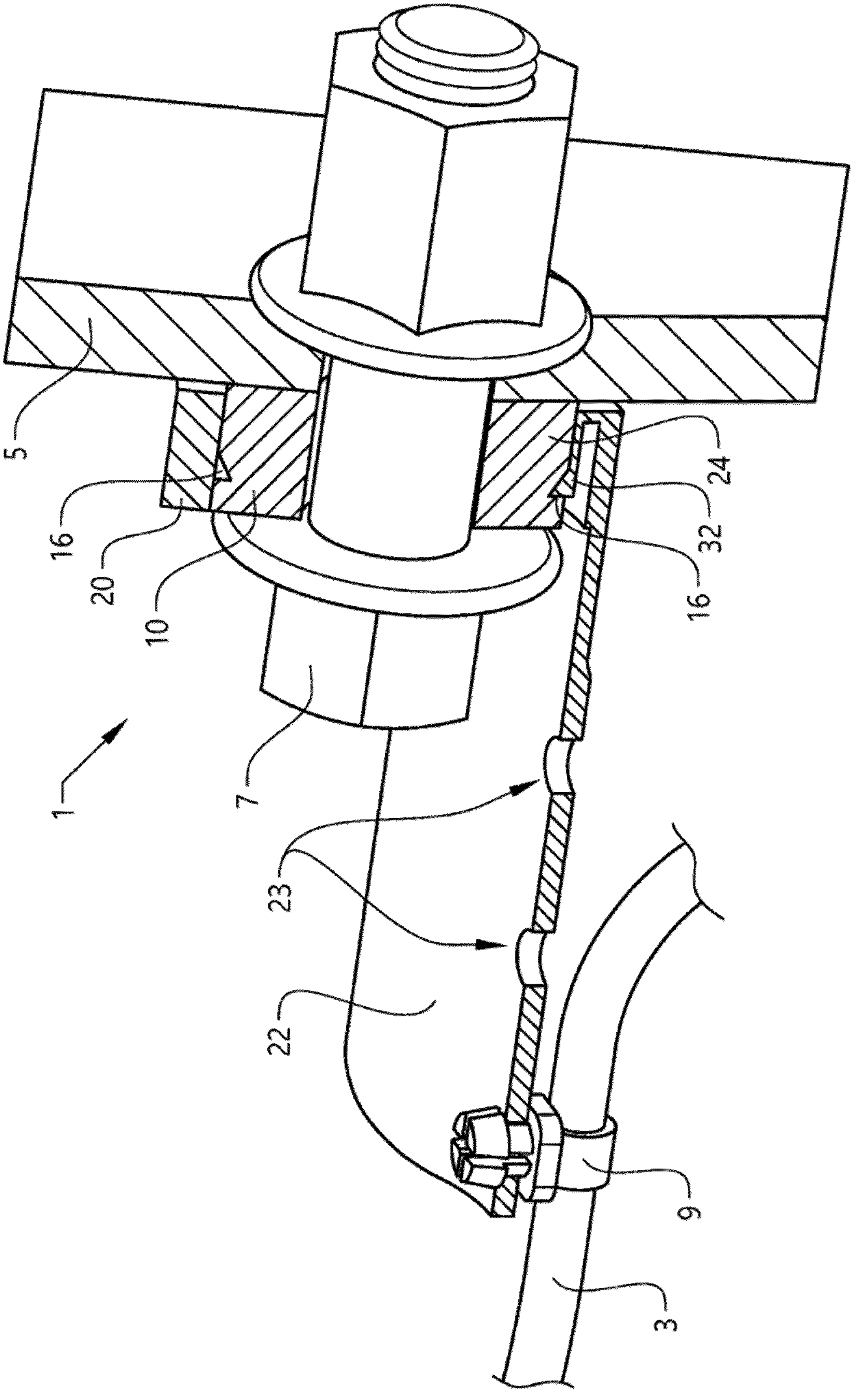
FIG. 4 is perspective view of the holder arrangement of FIG. 3, according to an example embodiment of the present invention.
Figure 5:
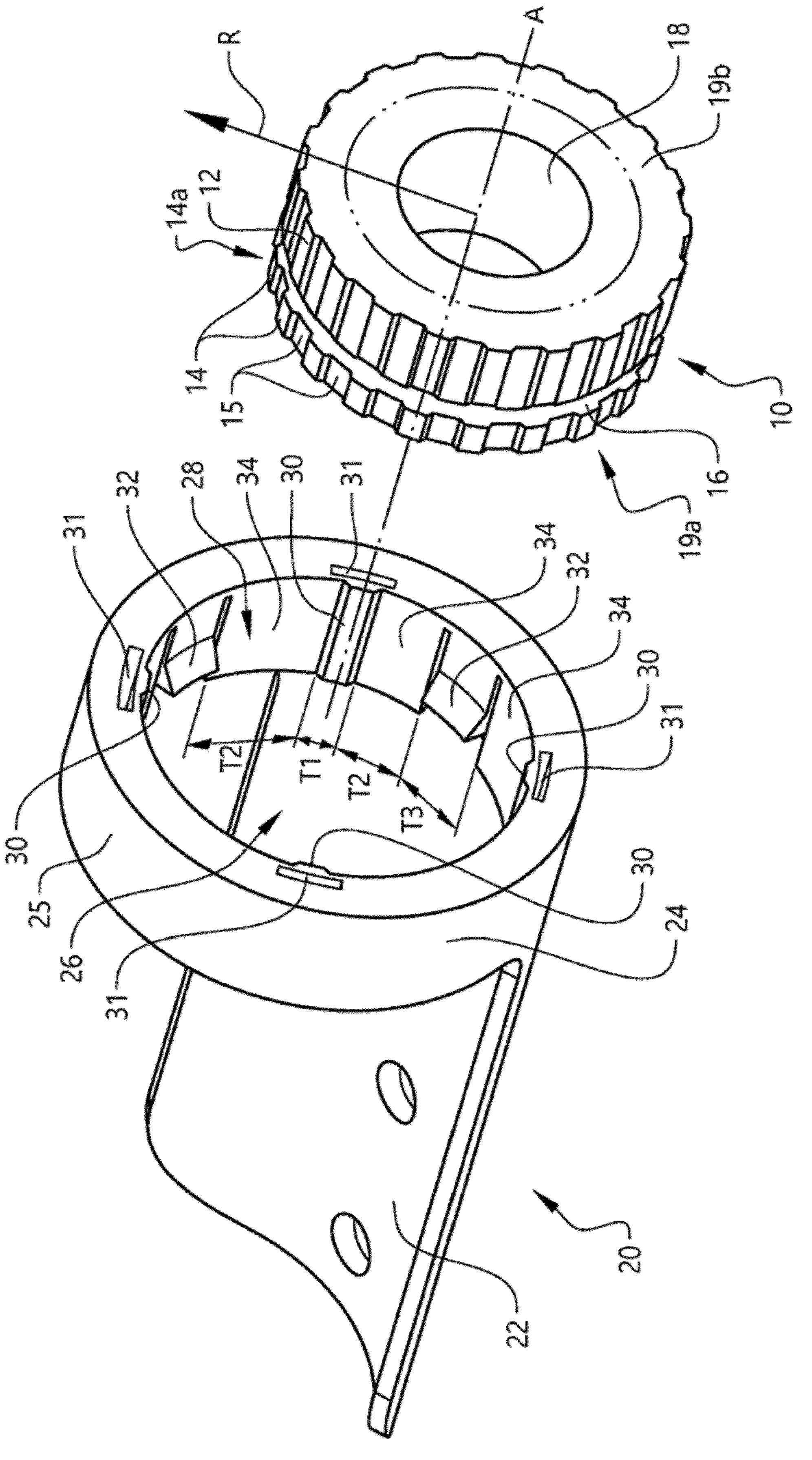
FIG. 5 is an exploded perspective view of a bracket and a spacer, according to an example embodiment of the present invention.

A general concept of the holder arrangement 1 of the invention will now be described in the non-limiting example of FIGS. 2A and 2B showing perspective, partly exploded, views of the holder arrangement 1 and its comprised spacer 10 and bracket 20, together with FIGS. 3 and 4 showing different perspective views of the holder arrangement 1 and FIG. 5 showing an enlarged perspective view of the bracket 20 and the spacer 10.

It should be noted that the holder arrangement, or more specifically the routing media supporting portion 22 of the bracket, is suitable for holding a cable or any elongated member such as e.g. a wire, a tube, a pipe, a hose, a conduit, or any other similar cable-like structure. The holder arrangement may further be configured to hold a plurality of such elongated members, i.e. for example a bundle of cables or the like. The routing media supporting portion may e.g. comprise openings for receiving and holding the cable or the like, or may comprise an attachment structure for receiving an attachment, such as e.g. a clamping stripe, which is used to hold and secure the cable or the like.

Moreover, it should be noted that the holder arrangement, and more specifically, the spacer 10 is configured for attachment to a support structure 5, wherein the support structure may be comprised in a wall portion, or a support element, to which the holder arrangement is to be mounted. In other words, the support structure may be referred to as a wall portion or a support element or a support wall portion.

The holder arrangement 1 comprises a spacer 10 being configured for attachment to the support structure 5 by a fastener 7, and a bracket 20 comprising a routing media supporting portion 22 configured to support routing media 3 (shown in FIGS. 3 and 4). The bracket 20 further comprises a spacer receiving portion 24 having a spacer receiving volume 26 for holding the spacer 10. Moreover, the spacer 10 comprises a spacer through hole 18 configured for receiving the fastener 7, such as e.g. the elongated body of a bolt 7, for attachment to the support structure 5. As also seen in FIG. 2B, the spacer receiving volume 26 of the spacer receiving portion 24 is a through hole 26 enabling access to the spacer 10, and thus also the fastener 7, when the spacer 10 is received in the spacer receiving volume 26. In FIG. 2A, the attachment of the spacer 10 to the support structure 5 by means of the fastener 7, and a nut 8 is shown, and in FIG. 2B, attachment of the bracket 20 to the preattached spacer 10 is shown. However, it should be noted that the spacer 10 and the bracket 20 can be pre-assembled before attaching the holder arrangement 1 to the support structure 5 by the fastener 7.

In FIGS. 3 and 4, the spacer 10 is shown as received in the spacer receiving volume 26 and is attached to the support structure 5 by means of the fastener 7 which is extending through the spacer through hole 18 and penetrates the support structure 5 to connect to the nut 8. Moreover, the routing media supporting portion 22 of the bracket 20 supports the routing media 3 such that the routing media is held, or is supported, in relation to the support structure 5. The routing media supporting portion 22 is shaped as an elongated portion 22 extending from the spacer receiving portion 24, and comprises a plurality of holes 23 wherein at least one of such holes 23 is used for holding the routing media 3, as seen in FIG. 4, or is used to hold an attachment structure which in turn, holds the routing media 3.

As best shown in FIG. 2A and FIG. 5, the spacer 10 has a uniform extension along the axial direction A of the spacer 10 and is cylindrically shaped. Note that CA' denotes a central axis and a corresponding direction extending along that axis. Hence there is herein an axial direction A and an axis A, which is meant will be clear from context. The spacer 10 has first side 19A being flat and extending in the radial direction of the spacer 10, and a second side 19B being flat and extending in the radial direction of the spacer 10, the second side 19B being axially spaced to the first side 19A. The spacer 10 further comprises an outer wall 12, here being a lateral outer wall 12, extending between the first side 19A and the second side 19B. The first side 19A may be referred to as a top side 19A or a the top portion 19A of the spacer 10, the second side 19B may be referred to as a bottom side 19B or a bottom portion 19B of the spacer 10. Here, the bottom side/portion 19B is referring to a side facing towards the support structure 5 when the holding arrangement 1 is attached to the support structure 5, and the top side/portion 19A is referring to a side facing in the opposite direction compared to the bottom side/portion 19B.

Moreover, at least a portion of the first side 19A is a fastener contacting surface 19C (shown in FIG. 2A) which, in use, is configured as a counter holding surface for the fastener 7, such as e.g. the bolt head of a bolt 7. The fastener contacting surface 19C has a smaller radial extension compared to a radial extension of the spacer receiving volume 26, such that the bracket 20 can be attached to the spacer 10 subsequently to fastening the spacer 10 to the support structure 5 by means of the fastener 7. In other words, there is disclosed herein a holder arrangement 1,101,101' wherein the spacer comprises a first side 19A perpendicularly arranged to the spacer through hole. The first side has a fastener contacting surface 19C which, in use, is configured as a counter holding surface for the fastener, such as e.g. the bolt head of a bolt. The fastener contacting surface has a smaller radial extension compared to a radial extension of the spacer receiving portion, such that the bracket can be attached to the spacer, subsequently to fastening the spacer to the support structure by means of the fastener.

Figure 11B:
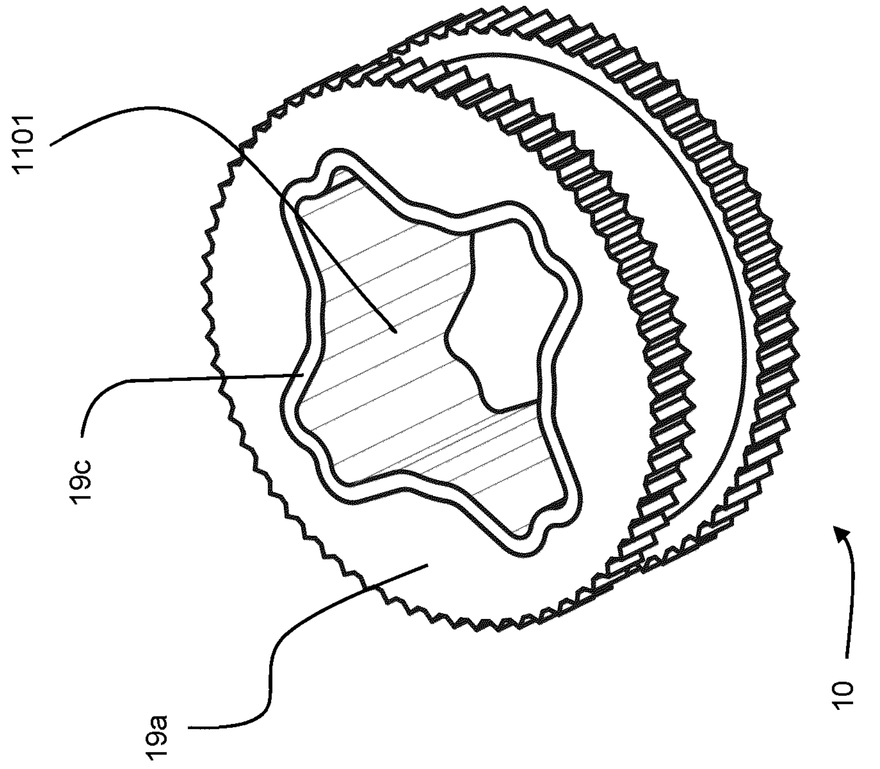
FIGS. 11A and 11B show an example spacer without a reinforcement portion (11A) and with a reinforcement portion (11B), according to an example embodiment of the present invention.
Figure 11A:
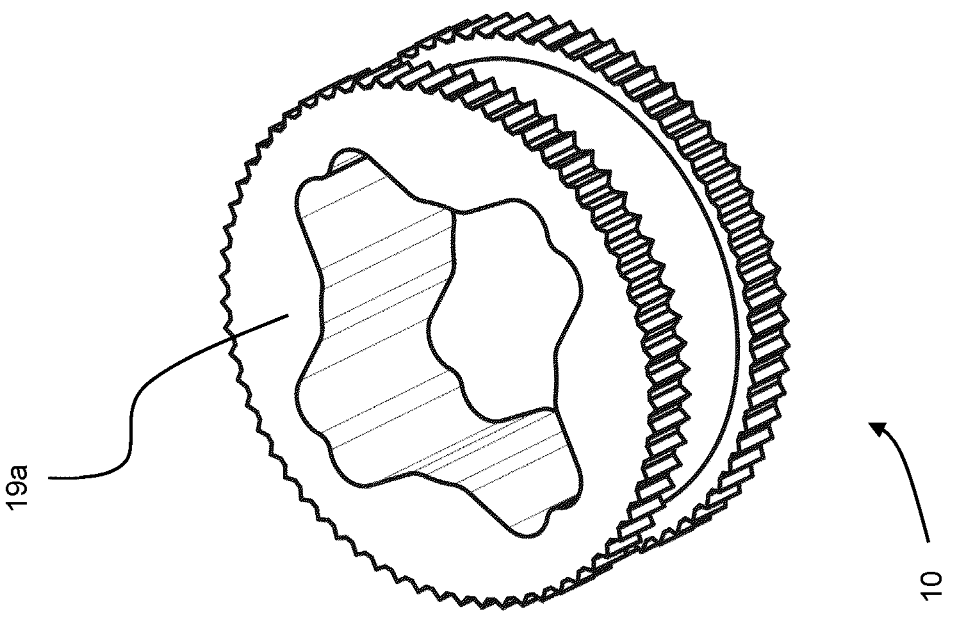

In the spacer, the fastener contacting surface 19C may optionally comprise a reinforcement portion. The fastener contacting surface 19C may be exposed to large compressive forces from a bolt axial force. Thus, there is a need for a fastener contacting surface that is structurally robust. It should, however, be robust without adding significant weight. FIG. 11B shows an example embodiment of the reinforcement portion arranged in the spacer. FIG. 11A shows the same spacer without the reinforcement portion. The reinforcement portion is an extension of the fastener contacting surface 19C in the axial direction A, preferably with the same axial length as the spacer. The reinforcement portion is preferably arranged snugly in the spacer.

Figure 12A:
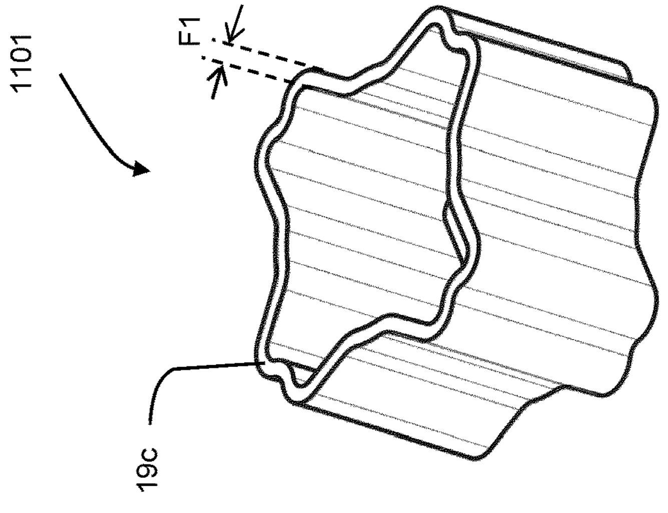
FIGS. 12A, 12B and 12C show different embodiments of the reinforcement portion of the present invention.
Figure 12B:
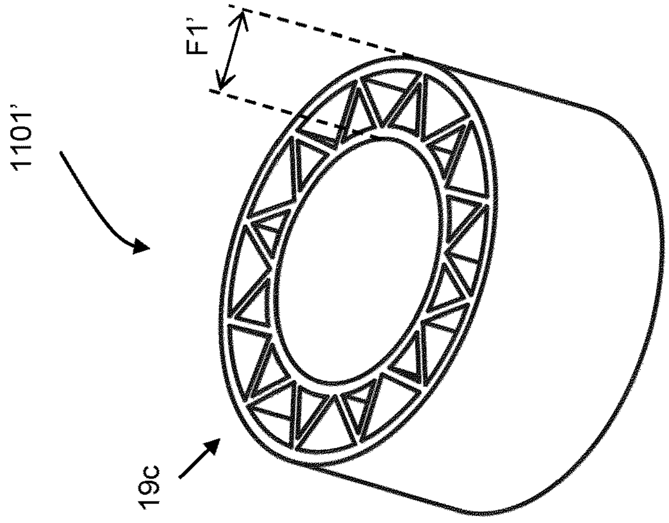

The reinforcement portion may have different shapes. FIGS. 12A, B, and C show three different example shapes of the reinforcement portion. FIG. 12A shows a reinforcement portion 1101 wherein the fastener contacting surface 19C comprises circular shape with four radial protrusions. The fastener contacting surface comprises a central through hole and the width of the fastener contacting surface is F1. This shape resembles a cross or a plus sign. This shape is to add more material to increase the stiffness of the reinforcement. The fold in the metal part can take more load without buckling. The innermost surface/features of the reinforcement will centrally locate the fastener. The final shape could have any numbers of extension from center (the example has four extensions). The fastener contacting surface extends uniformly in the axial direction to form the reinforcement portion 1101. FIG. 12B shows a reinforcement portion 1101' wherein the fastener contacting surface 19C comprises circular shape. The fastener contacting surface comprises a central through hole and the width of the fastener contacting surface is F1'.

Figure 12C:
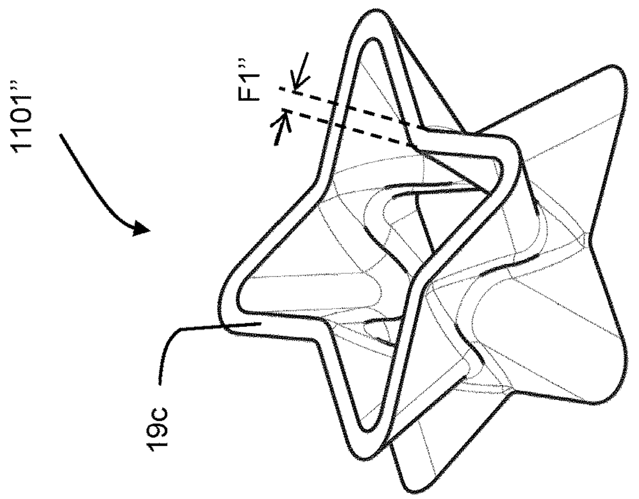

The fastener contacting surface extends in the axial direction to form the reinforcement portion 1101'. The fastener contacting surface 19C and corresponding reinforcement portion 1101' comprises a reinforced structure, which in this particular embodiment is a honeycomb structure, but could be any type of lattice structure. Such pattern is structurally rigid without adding significant weight. Other reinforced structures with air-filled gaps are also possible. FIG. 12C shows a reinforcement portion 1101" wherein the fastener contacting surface 19C comprises four-point star shape. The fastener contacting surface comprises a central through hole and the width of the fastener contacting surface is F1". The fastener contacting surface extends in the axial direction to form the reinforcement portion 1101". The fastener contacting surface 19C and corresponding reinforcement portion 1101' comprises a reinforced structure. More specifically, a side axially opposite of the contacting surface 19C is has the same four-point star shape and is rotated axially relative to the contacting surface 19C. Both sides extend inwardly with an angle, to meet at a center in the axial direction. It is appreciated that the star shape can have less than four or more than four extensions.

The reinforcement portion is not necessarily made out of the same material as the spacer. For example, the spacer can be made out of plastic and the reinforcement portion can be made out of metal, since metal is structurally more robust than plastic. Another advantage of having the reinforcement portion made out of metal is that the creep property associated with plastic is avoided. In another example the spacer and the reinforcement portion are made out of different plastics with different structural properties.

According to at least one example embodiment, at least the spacer receiving portion 24 is made out of plastic. Hereby, the spacer receiving portion is made flexible, thus allowing the spacer to be moved inside the spacer receiving volume, even though the spacer is sized and dimensioned to snuggly, or tightly, fit inside the spacer receiving volume of the bracket.

As shown best in the example embodiment in FIG. 5, the spacer receiving portion 24 of the bracket 20 is cylindrically formed and comprises a cylindrical bracket wall 25. The cylindrical bracket wall 25 surrounds the spacer receiving volume 26. An inner wall 28 of the cylindrical bracket wall 25 faces the spacer receiving volume 26, and as is shown in both FIG. 2B and FIG. 5, the spacer receiving volume 26 is formed as a through hole 26 in the spacer receiving portion 24. The inner wall 28 is optionally provided with a bracket rotational locking arrangement 30, here in the form of axial bracket ridges 30. The inner wall is also provided with a bracket axial locking arrangement 32, here in the form of protrusions 32 of the inner wall 28. It should be noted that only one protrusion 32 may be sufficient for the bracket axial locking arrangement 32. Moreover, the inner wall 28 is provided with a bracket load transferring surface 34 being distant from the axial bracket ridges 30 and the protrusions 32. The axial bracket ridges 30 is arranged in the inner wall 28 along an axial axis A, i.e. in the axial direction of the inner wall 28, over four separate portions of the circumference of the inner wall 28. Hence the axial bracket ridges 30 are repeatedly and alternately arranged along the circumference of the inner wall 28. The axial bracket ridges 30 may be referred to as bracket threads 30 or bracket teeth 30. It should also be noted that each of the axial bracket ridges 30 may be divided into several axial bracket ridges, i.e. in FIG. 5, each one of the four separate portions of the circumference of the inner wall 28 comprising the bracket rotational locking arrangement 30, may be comprised of at least two or more axial bracket ridges. In other words, there is herein a disclosed holder arrangement 1,101,101', wherein the spacer comprises a rotational locking arrangement with axial spacer ridges 14 arranged along the axial direction A of the spacer, and the bracket comprises rotational locking arrangement with at least one axial bracket ridge 30 adapted to mate with the axial spacer ridges.

In more detail of the example embodiment in FIG. 5, the inner wall 28 of the cylindrical bracket wall 25 is circumferentially divided between a first wall portion type T1 comprising an axial bracket ridge 30, a second wall portion type T2 comprising at least a portion of the bracket load transferring surface 34, and third wall portion type T3 comprising a protrusion 32. As shown in FIG. 3, at least the first and second wall portion types T1, T2, are alternately and repeatedly arranged along the entire circumference of the inner wall 28. The third wall portion type T3 may be present in at least one portion of the inner wall 28, but also as shown in FIG. 5, in at least two portions of the inner wall 28. As an alternative embodiment, the second wall type T2 may be more common than each one of the first wall type T1 and the third wall type T3, as e.g. the first wall type T1 may be surrounded by the second wall type T2. Such configuration provides a large bracket load transferring surface area. In other words, there is disclosed herein a holder arrangement 1,101,101' wherein an inner wall of the spacer receiving portion is circumferentially divided between a first wall portion type T1 comprising the bracket rotational locking arrangement and a second wall portion type T2 comprising a bracket load transferring surface. The bracket load transferring surface is configured to engage the spacer to snugly fit the bracket to the spacer when the spacer is received in the spacer receiving portion. The first and second wall portion types are alternately and repeatedly arranged along the entire circumference of the inner wall.

By the provision of a holder arrangement having a bracket load transferring surface 34 being distant from the bracket rotational locking arrangement 30, unintentional movement between the bracket 20 and the spacer 10, e.g. due to the application of an external load on the bracket, can be reduced or even avoided, as the applied external load will propagate through the bracket, and over to the spacer, at least via the bracket load transferring surface. According to at least one example embodiment, the bracket load transferring surface is also distant from the bracket axial locking arrangement. Hence, for example, the bracket rotational locking arrangement 30 which mates with the spacer rotational locking arrangement 14, and/or the bracket axial locking arrangement 32 which mates with the spacer axial locking arrangement 16, when the spacer 10 is received in the spacer receiving volume 26 of the bracket 20, need not to transfer the whole load from the bracket to the spacer, which otherwise could lead to such stress that the bracket and the spacer disengages from each other. In other words, for a holder arrangement having no bracket load transferring surface being distant from the bracket rotational locking arrangement, and for which the load is transferred to a larger extent via the bracket rotational locking arrangement and/or the bracket axial locking arrangement, the risk of causing the bracket to unintentional move, e.g. rotate, relative the spacer is larger. Thus, the unintentional movement, which is avoided, or which has a reduced risk of occur, may be an unintentional rotational movement.

Stated differently, the holder arrangement is, and the spacer and the bracket are, arranged such that the bracket load transferring surface is functionally and structurally separated from at least the rotational locking arrangement, and possibly also functionally and structurally separated from the axial locking arrangement.

It should be understood that, when the spacer 10 is received in the spacer receiving volume 26 of the bracket 20, the bracket load transferring surface 34 is in contact with the spacer, or more specifically a portion of the outer wall of the spacer, such as e.g. a portion of the spacer rotational locking arrangement 14 of the spacer. Hereby, forces, or moment, stemming from the external load, can be transferred from the bracket to the spacer via the bracket load transferring surface which is distant from the bracket rotational locking arrangement, and possibly also distant from the bracket axial locking arrangement. It should be noted when referring to that an external load is applied to the bracket, forces or moment (or induced forces or induced moments), or a combination of the two, are typically transferred in the bracket and further to the spacer. Such phenomena may in the application text simple be referred to as a load transfer within the bracket, and from the bracket to the spacer. Naturally, the applied load is further transferred to the support structure via the spacer and any fastener used to fasten the spacer to the support structure.

By having the axial spacer ridges provided along the entire circumference of the outer wall, the rotational locking of the bracket and the spacer is activated as soon as the spacer is received in the spacer receiving volume of the bracket, regardless of direction of application.

The spacer 10 in FIG. 5 comprises an outer wall 12 being provided with corresponding spacer rotational locking arrangement 14, here in the form of axial spacer ridges 14, and corresponding spacer axial locking arrangement 16, here in the form of a circumferentially arranged groove 16. The axial spacer ridges 14 is in FIG. 5 arranged in the outer wall 12 in the axial direction, i.e. along the axial axis A, of the spacer 10 over the entire outer circumference of the spacer 10. Hence the axial spacer ridges 14 are repeatedly and alternately arranged along the entire circumference of the outer wall 12. The axial spacer ridges 14 may be referred to as spacer threads 14 or spacer teeth 14. Moreover, as seen in FIG. 5 the circumferentially arranged groove 16 is arranged in the outer wall 12 along the whole outer circumference of the spacer 10. The circumferentially arranged groove 16 is in FIG. 5, arranged in the outer wall 12, being a lateral wall 12, somewhere between the first side 19A (i.e. the top portion 19A or top side 19A) of the spacer 10, and a second side 19B (i.e. the bottom portion 19B or bottom side 19B) of the spacer 10, but it should be mentioned that the circumferentially arranged groove 16 may be arranged further towards one of the first side 19A and the second side 19B, or even be comprised in the first side 19A or the second side 19B. As best shown in FIGS. 2A and 5, the circumferentially arranged groove 16 is arranged as an interruption of the axial spacer ridges 14, such that each axial spacer ridge is divided into at least two portions, one portion above, and one portion below, the circumferentially arranged groove 16.

Figure 8A:
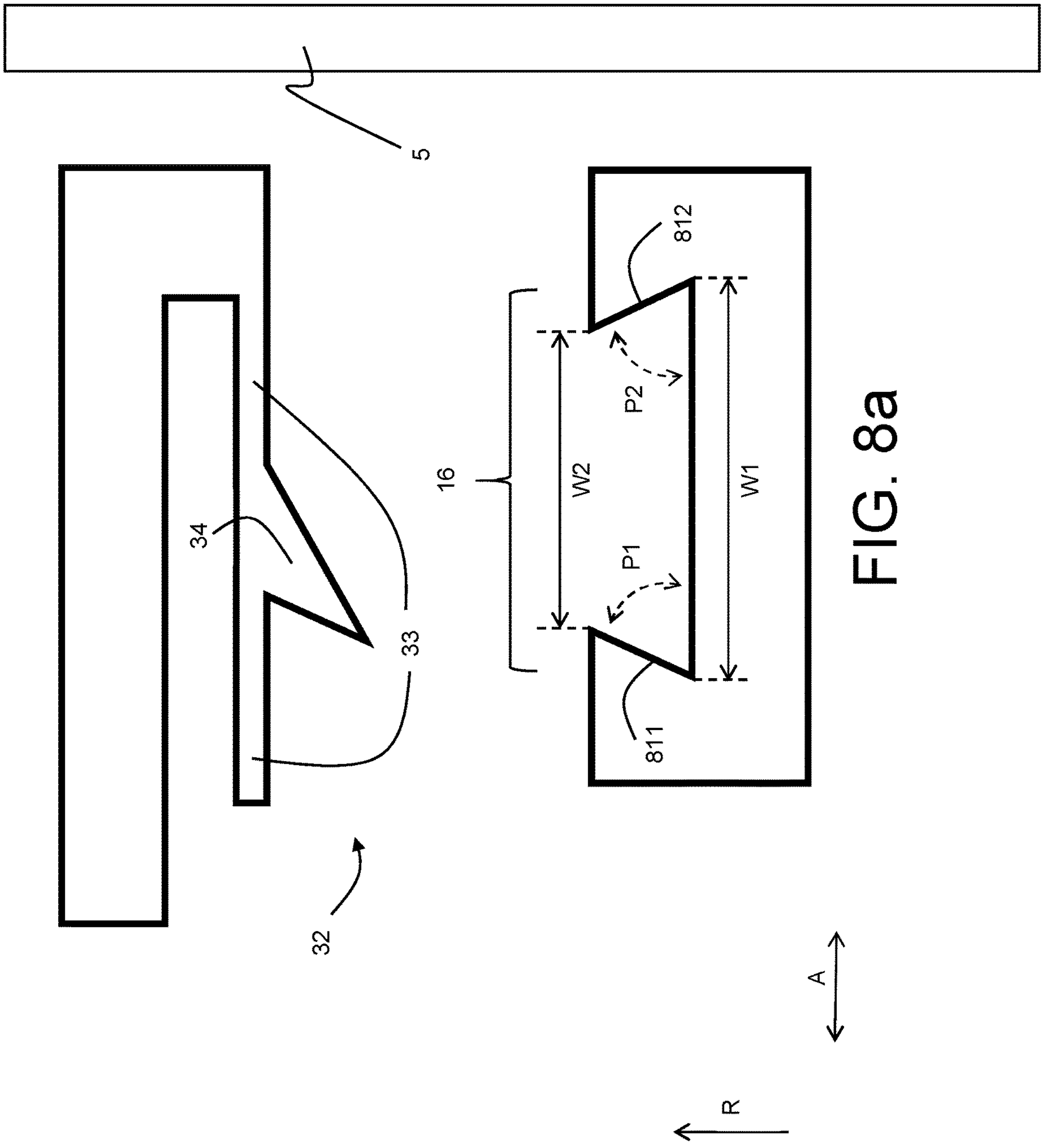
FIGS. 8A and 8B show detailed views of the snap-lock mechanism spacer, according to an example embodiment of the present invention.
Figure 8B:
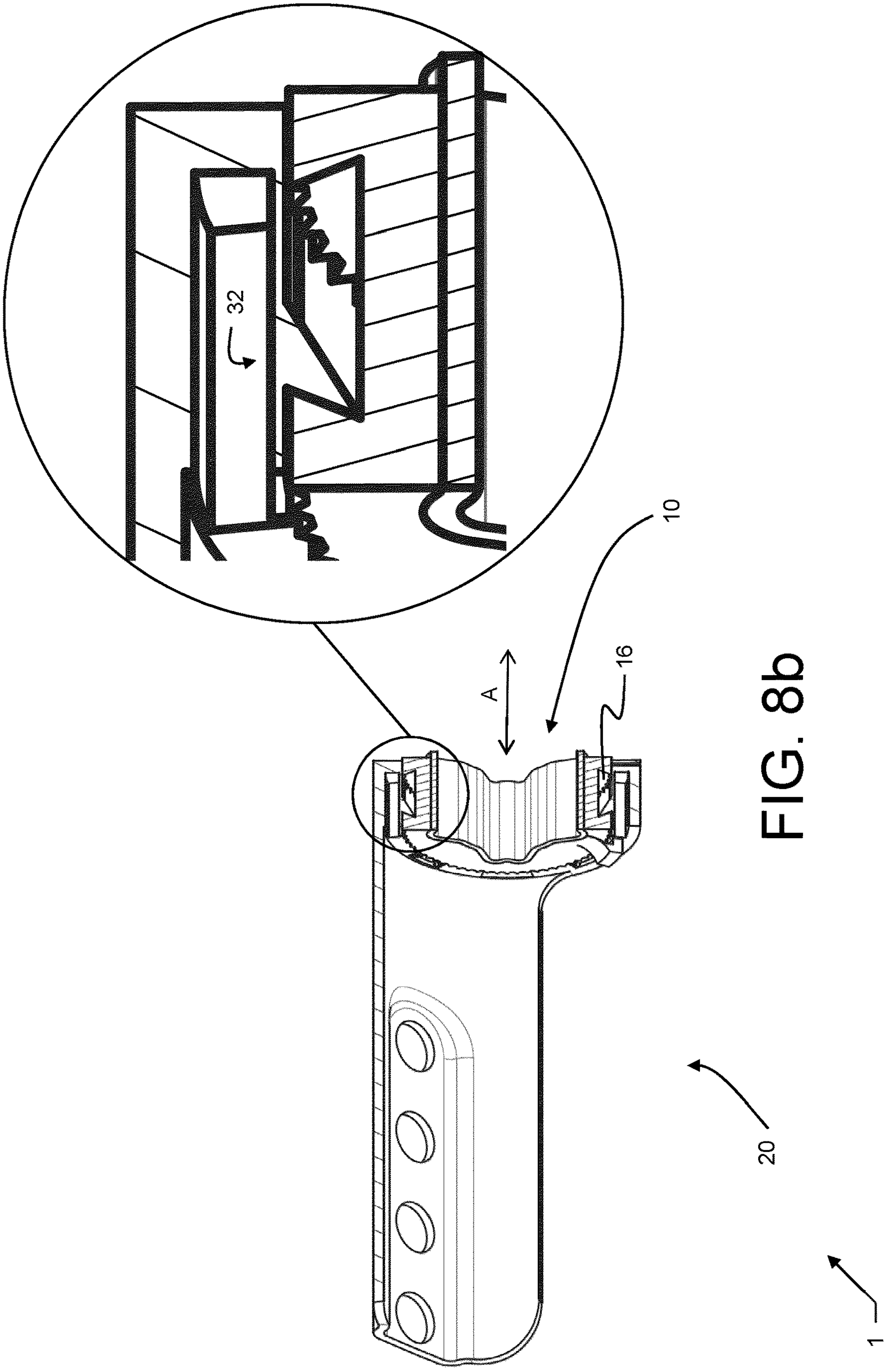

FIGS. 8*a* and 8*b* show details of a snap-lock mechanism formed by the bracket axial locking arrangement 32 and the spacer axial locking arrangement 16. In these example embodiments, the spacer axial locking arrangement 16 comprises a circumferential groove and the bracket axial locking arrangement 32 comprises a plurality of protrusions 34. The groove comprises a first and a second side wall 811,812. The second side wall 812 is closer to the support structure 5,5' compared to the first side wall 811 when the spacer 10,110, 210 is received in the spacer receiving portion. The first side wall forms a first angle P1 with respect to the groove base such that a width of the base of the groove W1 is wider than the width of the top of the groove W2 in the axial direction A. The at least one protrusion comprises a contact surface arranged to match the first side wall.

When the bracket engages the spacer, i.e. when spacer is about to be received in the spacer receiving portion, a push-in force is required on the bracket in the axial direction A towards the support structure 5,5', which the spacer is attached on. The push force is needed for a protrusion support structure 33 of the bracket axial locking arrangement 32 to bend in the radial direction R, in order for the protrusion 34 to engage a snap-lock to the groove. Once the snap-lock mechanism is engaged, the bracket is axially locked to the spacer. The snap-lock mechanism can withstand a force in the axial direction A facing away from the spacer, i.e. pull force which is in the opposite direction of the push force. At some point, as the pull force increases, the snap-lock mechanism will fail, and the bracket will come loose from the spacer. This is at least partly due to the protrusion support structure 33 bending in the radial direction R. It is desirable to be able to withstand a pull force as large as possible. However, the required push force for engaging the snap-lock generally increases as the tolerance for withstand pull forces increases. It is desirable to have the required push force as small as possible to simply assembly of the holder arrangement One way of increasing the tolerated pull force is to increase the thickness of the protrusion support structure 33. An increasing thickness increases the required force to bend the protrusion support structure 33 in the radial direction R. This, however, also increases the required push force, which is undesired. Another way of increasing the tolerated pull force is to require an angle in the snap-lock, which is disclosed in the holder arrangement herein. The angle P1 of the first wall 811 increases the tolerated pull force, compared to a 90-degree angled side wall, without increasing the required push force. With the angle P1, the protrusion 34 is must shear in the axial direction A to disengage the snap-lock. The force required for the protrusion 34 to shear is larger than the force required for the protrusion support structure 33 to bend. Thus, the tolerated pull force is larger than the required push force.

In other words, there is disclosed herein a holder arrangement 1,101,101' for holding routing media 3,3' to a support structure 5, 5'. The holder arrangement comprises a spacer 10,110,210 configured for attachment to the support structure. The holder arrangement further comprises a bracket 20,120,220, the bracket comprising a routing media supporting portion 22,122,222 configured to support the routing media, a spacer receiving portion 24,124,224 for receiving the spacer, and a bracket axial locking arrangement 32 arranged to engage a corresponding spacer axial locking arrangement 16 comprised in the spacer to axially lock a received spacer. At least one of the spacer axial locking arrangement 16 and the bracket axial locking arrangement 32 comprises a circumferential groove and wherein the other of the spacer axial locking arrangement 16 and the bracket axial locking arrangement 32 comprises a corresponding protrusion. The groove has a first 811 and a second 812 side wall extending radially from a groove base, and laterally to an axial direction A, the second side wall 812 being closer to the support structure 5, 5' compared to the first side wall 811 when the spacer is received in the spacer receiving portion. The holder arrangement is characterized in that at least the first side wall forms a first angle P1 with respect to the groove base such that a width of the base of the groove W1 is wider than the width of the top of the groove W2 in the axial direction A. The at least one protrusion comprises a contact surface arranged to match the first side wall, thereby forming a catch mechanism.

According to aspects, the spacer axial locking arrangement 16 comprises the groove and the bracket axial locking arrangement 32 comprises the at least one protrusion 34.

According to aspects, the spacer axial locking arrangement 16 comprises the at least one protrusion 34 and the bracket axial locking arrangement 32 comprises the groove.

The first angle P1 of the first side wall 811 is preferably in the span of 20 to 45 degrees. If the first angle is large than 45 degrees, the force required for the protrusion support structure 33 to bend may come larger than the force required for the protrusion 34 to shear. If the first angle is less than 20 degrees, the protrusion 34 and the first side wall may become brittle.

In an example embodiment of the disclosed holder arrangement, the second side wall 812 forms a second angle P2 with respect to groove base, wherein the second angle P2 has the same value as the first angle P1. A circumferential groove with symmetrical side walls is easier to manufacture. In addition, if the groove has symmetrical side walls and is arranged centered in the axial direction on the spacer, the spacer may be mounted in any of the two axial orientations onto the support structure 5,5', which is advantageous.

As the bracket engages the spacer, the protrusion support structure 33 first bends in the radial direction R. As the bracket is pushed in the axial direction A, towards the support structure 5,5', which the spacer is attached on, the protrusion 34 will eventually snap into place in the groove. Thereafter, the bracket might have some play in axial direction A, due to the first angle P1 of the first wall 811. To eliminate the eventual play, the bracket my optimally comprise at least one resilient member 911,911' configured to repel the bracket axially in a direction away from the support structure 5,5' to engage a snap-lock of the bracket and the spacer 10,110,210. This way, the protrusion 34 will become locked into place in the groove, wherein the protrusion is arranged snugly against the first side wall 811. The resilient member provides a spring feature that results in a force exerted on the bracket in the axial direction A away from the support structure 5,5', which the spacer is attached on. Thereby, the bracket becomes locked into a final position.

Figure 9:
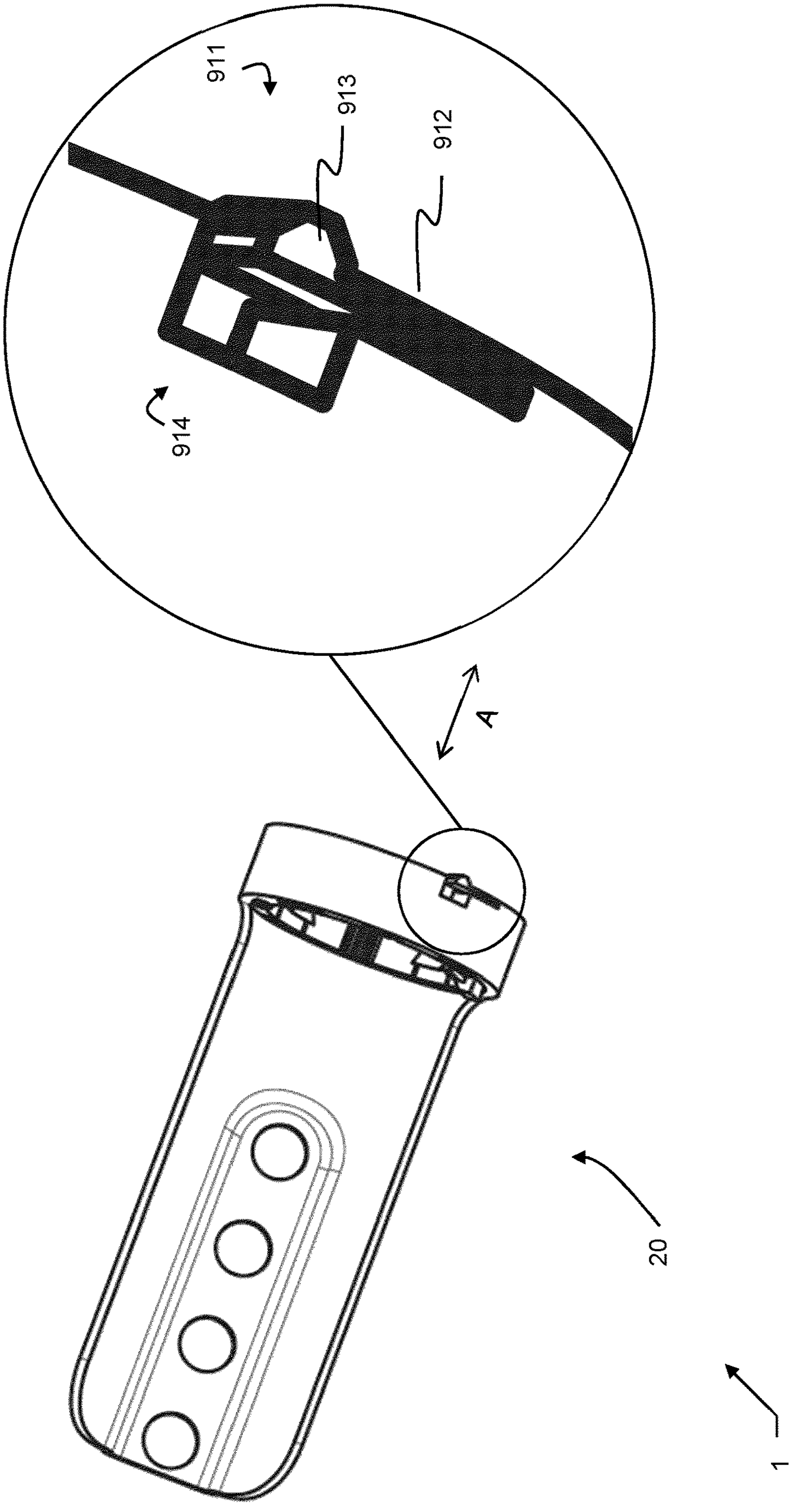
FIG. 9 shows an example embodiment of a resilient member of the present invention.
Figure 10:
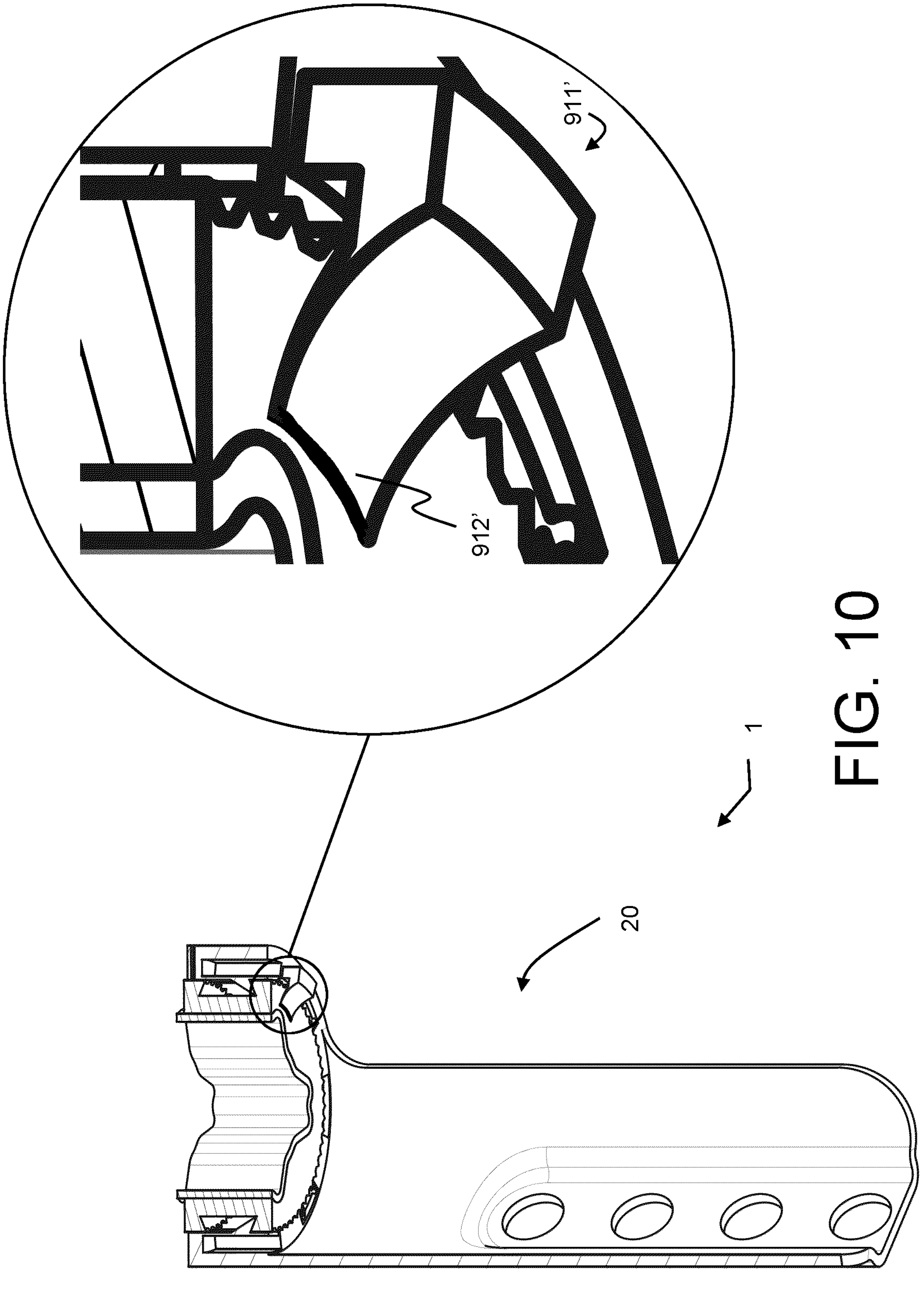
FIG. 10 shows an example embodiment of a resilient member of the present invention.

FIGS. 9 and 10 show example embodiments of the resilient member 911,911'. In FIG. 9, the resilient member 911 is arranged on the bracket and is configured to engage the support structure 5,5' or another bracket (as in FIGS. 6 and 7). The resilient member 911 comprises an arm 912 and a resilient protrusion 913. When the bracket engages the support structure 5,5' or another bracket, the resilient protrusion bends in the axial direction A, into the cavity 914 in the bracket. Thereby, the resilient member 911 exerts a force on the bracket in the axial direction A away from the support structure, which locks the bracket into its final position. In FIG. 10, the resilient member 911' is arranged on the bracket and is configured to engage the spacer 10,110,210. The resilient member 911' comprises an arm 912'. When the bracket engages the spacer, the arm 912' bends in the axial direction A. Thereby, the resilient member 911 exerts a force on the bracket in the axial direction A away from the support structure, which locks the bracket into its final position.

In the example embodiments of FIGS. 9 and 10, the resilient member relies on a spring effect to exert a force upon the bracket. As such, the resilient member may comprise a flexible material, such as plastic or thin metal. Other shapes of the resilient members with a spring effect are possible. Alternatively, or in combination of, the resilient member may rely on compression to exert a force upon the bracket, as in a bushing. As such, the resilient member may comprise a compressible material, such as rubber.

There is preferably a plurality of resilient members distributed uniformly and circumferentially around the bracket to uniformly distribute the force exerted on the bracket. A single resilient member is, however, also possible.

Moreover, as shown in FIG. 5, the spacer receiving portion 24 is provided with a gap 31 or a through hole 31 adjacent, and arranged radially outwards of, each one of the axial bracket ridges 30. The gaps 31 or through holes 31 are typically shaped and dimensioned to receive and at least partly house a respective axial bracket ridge 30. Hereby, the axial bracket ridges 30 may be moved radially outwards towards, and into, the gaps 31 or through holes 31 upon the application of a certain threshold load, such as e.g. an intentional rotational force applied to the bracket 20 and made in order to intentional rotate the bracket 20 relative the spacer 10, even when the spacer 10 is received in the spacer receiving volume 26. Thus, the bracket 20 may be forcefully rotated even when the spacer 10 is received in the spacer receiving volume 26. Thus, by forcibly applying a force to rotate the bracket 20 in relation to the spacer 10, the axial bracket ridges 30 will deflect, into the gaps 31 or through holes 31, when encountering the axial spacer ridges 14 which is held in position relative the support structure 5 by the fastener 7, and thus, the bracket 20 may be intentional rotated relative the spacer 10 and the support structure 5. That is, the bracket 20 can be rotationally positioned in relation to the support structure 5 even after assembly of the bracket 20 to the spacer 10.

It should be noted that the axial axis A of the bracket 20 and the axial axis A of the spacer 10 typically coincides or are the same. Correspondingly, the radial axis R of the bracket 20 and the radial axis R of the spacer 10 are typically parallel to each other, or are the same or coincides when the spacer 10 is received in the spacer receiving volume 26.

Turning back to FIGS. 3 and 4, in which the spacer 10 is received in the spacer receiving volume 26, the bracket axial locking arrangement 32 mates with the spacer axial locking arrangement 16, i.e. the protrusion 32 is snap-locked into the circumferentially arranged groove 16, to axially lock the bracket 20 in relation to the spacer 10. Moreover, the bracket rotational locking arrangement 30 mates with the spacer rotational locking arrangement 14, as e.g. is shown in the enlargement in FIG. 3, an axial bracket ridge 30 mates with two axial spacer ridges 14, or rather an axial spacer groove 15, to rotationally lock the bracket 20 in relation to the spacer 10. Thus, the bracket 20 can be rotationally positioned in relation to the support structure 5 by means of the spacer 10. Moreover, in the assembled state shown in FIGS. 3 and 4, i.e. when the spacer 10 is received in the spacer receiving volume 26, the bracket load transferring surfaces 34 is in contact with the outer wall 12 of the spacer 10, or more specifically, in contact with the top portion of some of the axial spacer ridges 14, for transferring loads from the bracket 20 to the spacer 10. By transferring loads (e.g. forces or moments) via surfaces not providing for the axial or rotational locking, unintentional movement of the bracket 20 relative the spacer 10 can be avoided, or the risk thereof at least be reduced. In other words, as the bracket rotational and axial locking arrangement (i.e. the protrusion 32 and the axial bracket ridges 30) are distant, and separated from the bracket load transferring surfaces 34, load (e.g. forces and moments) may be transferred between the bracket 20 and the spacer 10, such as between the inner wall portion 28 of the spacer receiving portion 24 and the outer wall 12 of the spacer 10, at least as a complement to load transfer via the rotational and axial locking arrangement.

As best shown in FIGS. 2A and 5, each one of the axial spacer ridges 14 has an arcuate top 14A matching the load transferring surface 34. This enables a relatively large contact surface area with a bracket load transferring surface 34 of the bracket 20. However, it should be noted that not all, or none, of the axial spacer ridges 14 need to have an arcuate top 14A. Thus, according to at least one example embodiment, the axial spacer ridges, or at least some of the axial spacer ridges, have an arcuate top matching the load transferring surface 34. The arcuate top may e.g. have a width of between 0.1 mm and 5 mm, such as e.g. between 0.5 mm and 2 mm. However, the width of the actuate top may be larger than 2 mm depending on the arrangement, and the number of axial spacer ridges. For example, the axial spacer ridges may be four, and may thus be angled to each other by 90°, or may be eight and angled to each other by 45°. For such configurations, the flat top has a width which is typically larger than 2 mm.

Figure 6:
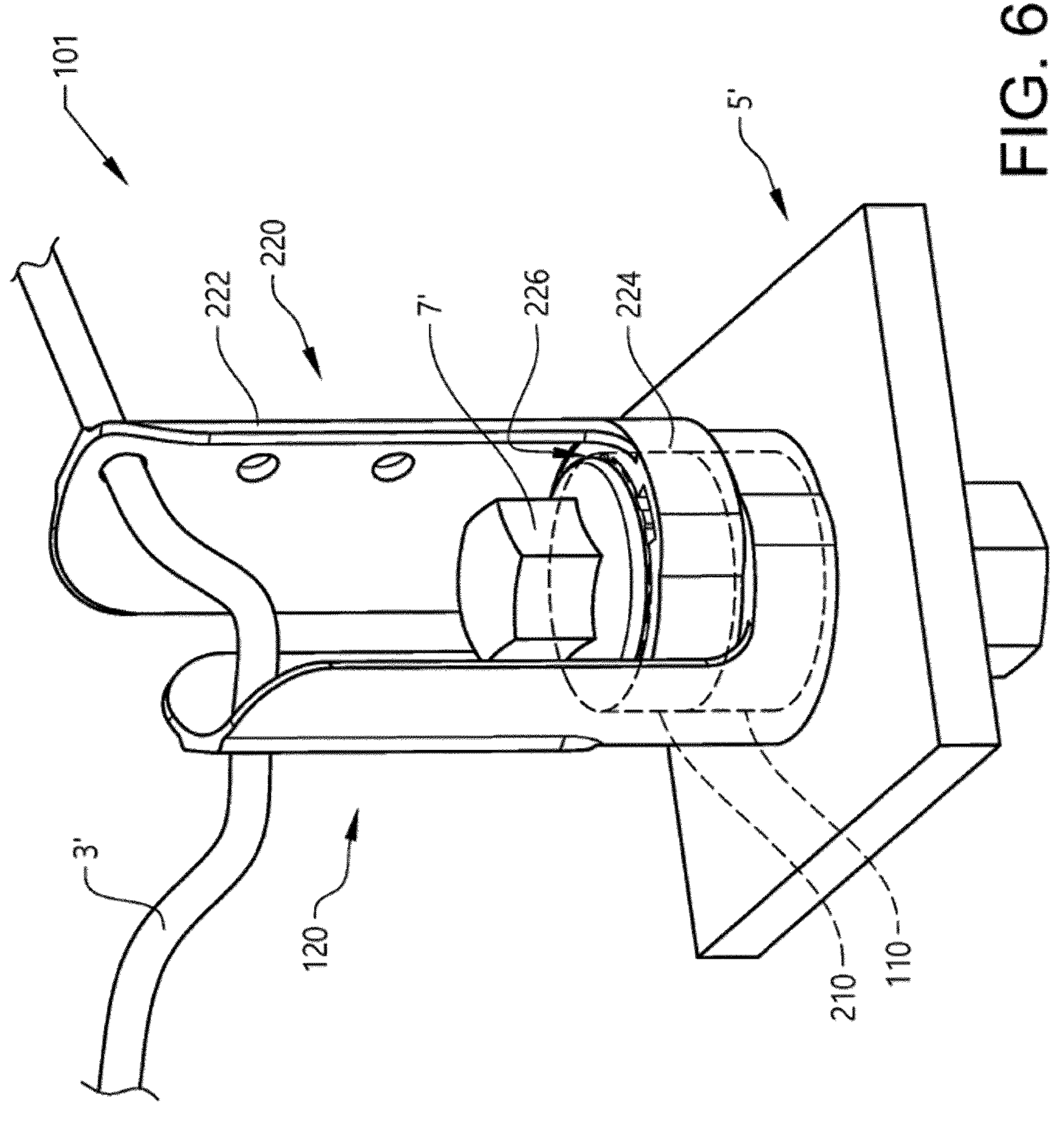
FIG. 6 is a perspective view of another holder arrangement comprising two brackets and two spacers, according to an example embodiment of the present invention.

In the non-limiting example of FIG. 6, an alternative holder arrangement 101 is shown. The holder arrangement 101 comprises a first spacer 110 being equal, or similar to, the spacer 10 of the holder arrangement 1 of FIGS. 2A-5, (thus, the same reference numerals for the spacer 10 are used for the first spacer 110, but with the addition of the number "100"), and a second spacer 210 being equal, or substantially equal, to the first spacer 110. Moreover, the holder arrangement 101 comprises a first bracket 120 being equal, or similar to, the bracket 20 of the holder arrangement 1 of FIGS. 2A-5 (thus, the same reference numerals for the bracket 20 are used for the first bracket 120, but with the addition of the number "100"), and a second bracket 220 having a routing media supporting portion 222 configured to support routing media 3', and a spacer receiving portion 224 having a spacer receiving volume 226 for holding the second spacer 210, wherein the spacer receiving portion 224 of the second bracket 220 is equal, or substantially equal, to the spacer receiving portion 124 of the first bracket 120. Thus, the holder arrangement 101 of FIG. 5 is configured for attachment to a support structure 5' by a fastener 7' very similar to the holder arrangement 1 of FIGS. 2A-5. However, for the holding arrangement 101 of FIG. 5, the first and the second spacers 110, 210 are stacked on top of each other such that their respective spacer through holes align and thus enabling fastening of the first and the second spacers 110, 210 to the support structure 5' by the same fastener 7.

Figure 7:
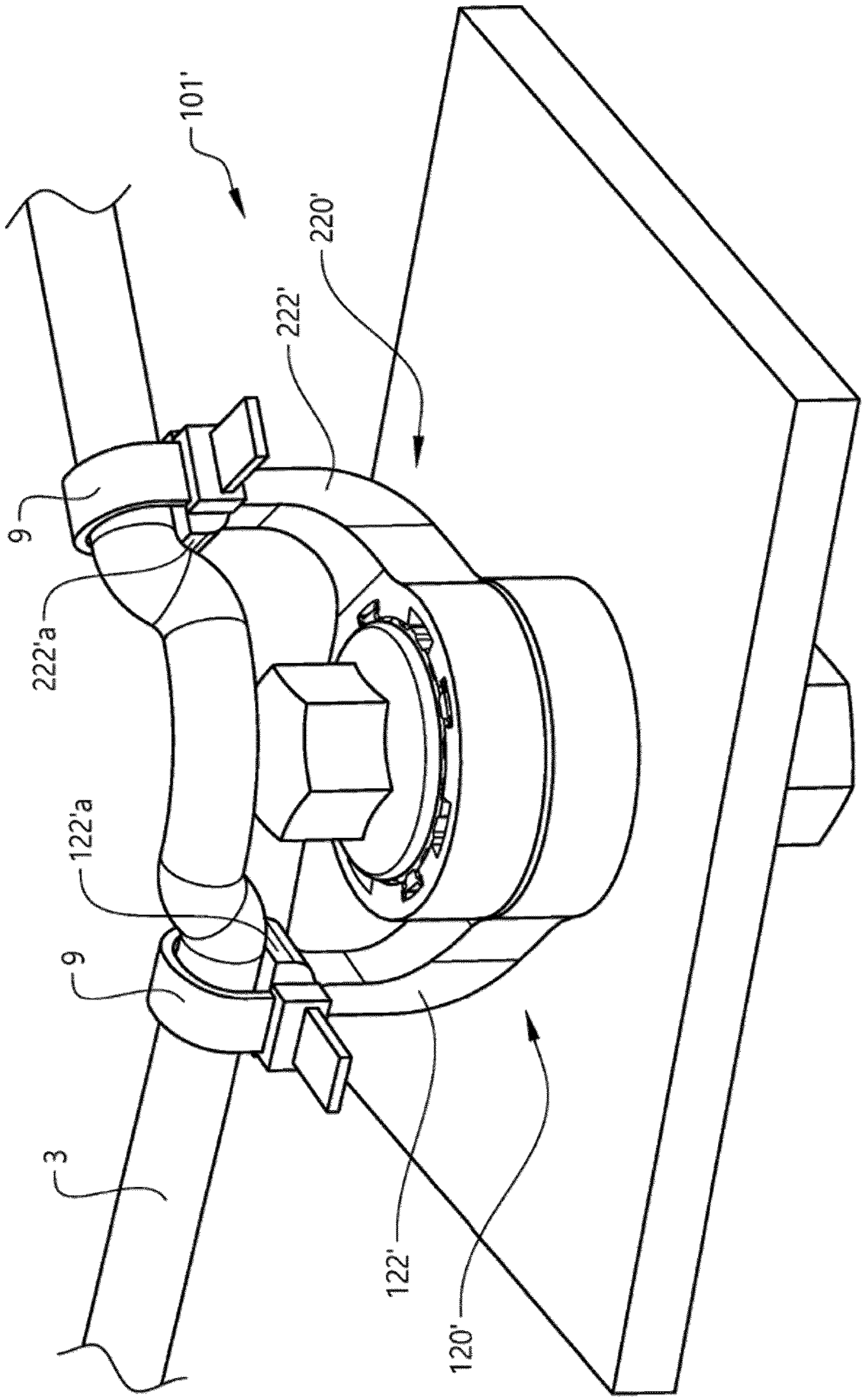
FIG. 7 is a perspective view of yet another holder arrangement comprising two brackets and two spacers, according to an example embodiment of the present invention.

In the non-limiting example of FIG. 7, an alternative holder arrangement 101' is shown. The holder arrangement 101' is very similar to the holder arrangement 101 of FIG. 6, but with the difference that the respective routing media supporting portion 122', 222' of the first and second brackets 120', 220' respectively, is formed differently compared to the routing media supporting portion 122, 222 of the holder arrangement 101 of FIG. 6. In FIG. 7, the respective routing media supporting portion 122', 222' comprises an attachment structure 122A, 222'A for receiving an attachment, such as e.g. a clamping stripe 9, which is used to hold and secure the routing media 3.

It should further be noted that the vehicle 800 if FIG. 1 may comprise the holder arrangement 1 of FIGS. 2A-5, or the holder arrangement 101 of FIG. 6, or the holder arrangement 101' of FIG. 7.

It is to be understood that the present invention is not limited to the embodiments described above and illustrated in the drawings; rather, the skilled person will recognize that many changes and modifications may be made within the scope of the appended claims.

The invention claimed is:

1. A holder arrangement for holding routing media to a support structure of a vehicle, the holder arrangement comprising:
- a spacer defining a spacer through hole configured to receive a fastener for attachment to the support structure, the spacer comprising a spacer axial locking arrangement; and
- a bracket comprising:
  - a routing media supporting portion defining at least one aperture configured to support the routing media, and
  - a spacer receiving portion at an end of the routing media supporting portion, the spacer receiving portion defining a bracket through hole to receive the spacer, the spacer receiving portion comprising a bracket axial locking arrangement arranged to engage the spacer axial locking arrangement to axially lock a received spacer relative to the bracket,
  - wherein the spacer axial locking arrangement and the bracket axial locking arrangement comprise a circumferential groove and at least one protrusion, the at least one protrusion configured to snap lock into the circumferential groove when the spacer receiving portion receives the spacer,
  - wherein the groove comprises a first and a second side wall extending radially from a groove base and laterally to an axial direction, the groove base radially offset from an opening of the groove,
  - wherein a width of the groove base is wider than a width of the opening of the groove as measured along the axial direction.

2. The holder arrangement of claim 1, wherein the spacer axial locking arrangement comprises the groove and the bracket axial locking arrangement comprises the at least one protrusion.

3. The holder arrangement of claim 1, wherein the spacer axial locking arrangement comprises the at least one protrusion and the bracket axial locking arrangement comprises the groove.

4. The holder arrangement of claim 1, wherein the bracket comprises at least one resilient member configured to repel the bracket axially in a direction away from the support structure such that the spacer axial locking arrangement engages the bracket axial locking arrangement in a locking position.

5. The holder arrangement of claim 1, wherein a first angle of the first side wall is between 20 degrees and 45 degrees.

6. The holder arrangement of claim 5, wherein the second side wall forms a second angle with respect to the groove base.

7. The holder arrangement of claim 6, wherein the second angle has the same angle value in degrees as the first angle.

8. The holder arrangement of claim 1, wherein the spacer comprises a rotational locking arrangement with axial spacer ridges arranged along the axial direction of the spacer, and the bracket comprises a rotational locking arrangement with at least one axial bracket ridge or an axial resilient ridge adapted to mate with the axial spacer ridges.

9. The holder arrangement of claim 8:
- wherein an inner wall of the spacer receiving portion is circumferentially divided between a first wall portion type comprising the bracket rotational locking arrangement and a second wall portion type comprising a bracket load transferring surface, wherein the bracket load transferring surface is configured to engage the spacer to snugly fit the bracket to the spacer when the spacer is received in the spacer receiving portion, and wherein the first and second wall portion types are alternately and repeatedly arranged along the entire circumference of the inner wall.

10. The holder arrangement of claim 1:

wherein the spacer receiving portion is a through hole enabling access to the spacer when the spacer is received in the spacer receiving portion.

11. The holder arrangement of claim 10:

wherein the spacer further comprises a first side perpendicularly arranged to the spacer through hole, the first side having a fastener contacting surface which, in use, is configured as a counter holding surface for the fastener, and wherein the fastener contacting surface has a smaller radial extension compared to a radial extension of the spacer receiving portion, such that the bracket can be attached to the spacer subsequent to fastening the spacer to the support structure by means of the fastener.

12. The holder arrangement of claim 11, wherein the fastener contacting surface comprises a reinforcement portion.

13. The holder arrangement of claim 12, wherein the reinforcement portion comprises a reinforced structure.

14. The holder arrangement of claim 10, wherein the spacer is a first spacer and the bracket is a first bracket, and the holder arrangement further comprises:

a second spacer configured for attachment to the support structure, the second spacer being equal, or substantially equal, to the first spacer, and a second bracket having a routing media supporting portion configured to support routing media and a spacer receiving portion for holding the second spacer, the spacer receiving portion of the second bracket being equal, or substantially equal, to the spacer receiving portion of the first bracket, wherein, in use, the first and the second spacers can be stacked on top of each other such that the spacer through holes align and thus enabling fastening of the first and the second spacers to the support structure by the same fastener.

15. A vehicle comprising the support structure and the holder arrangement of claim 1.

* * * * *